United States Patent Office 3,547,982
Patented Dec. 15, 1970

3,547,982
BENZYLIC OXIDATION PROCESS FOR PREPARATION OF ARYLALKYL ESTERS
James E. McKeon, Charleston, and David R. Bryant, South Charleston, W. Va., assignors to Union Carbide Corporation, a corporation of New York
No Drawing. Filed Mar. 13, 1967, Ser. No. 622,435
Int. Cl. C07c 69/24, 69/14
U.S. Cl. 260—488
13 Claims

ABSTRACT OF THE DISCLOSURE

A liquid phase process in which an aromaticaliphatic compound having a benzylic hydrogen atom is contacted with an oxidizing agent and a saturated aliphatic alcohol or an organic carboxylic acid free of olefinic or acetylenic unsaturation, in the presence of Pd(II) as catalyst, thereby oxidizing the aromaticaliphatic compound at the benzylic carbon atom. The rate of the reaction is increased by the addition of certain catalyst modifiers, especially compounds of tin and phosphorus.

---

This invention relates to a liquid phase process for benzylic oxidation. In one aspect the invention relates to a catalytic process for the preparation of arylaliphatic esters of organic carboxylic acids. In another aspect the invention relates to a catalytic process for the preparation of arylaliphatic ethers of saturated aliphatic alcohols. A further aspect of the invention relates to a catalytic process for the production of the aforesaid esters or ethers, in the presence of oxygen whereby the activity of the catalyst is extended over extremely long periods of time. A yet further aspect is directed to a two-step process for the production of esters or ethers whereby either or both steps can be effected in the presence of oxygen. Still another aspect concerns novel catalytic systems for effecting the above-said processes.

In a broad aspect the novel process involves contacting an aromaticaliphatic compound having a benzylic hydrogen atom with an oxidizing agent and either an organic carboxylic acid free of ethylenic or acetylenic unsaturation or a saturated aliphatic alcohol in the presence of a catalyst, e.g., Pd(II). The process is conducted for a period of time sufficient to replace at least one benzylic hydrogen atom from said aromaticaliphatic compound with the aforesaid acid or alcohol sans the active carboxyl hydrogen or hydroxyl hydrogen, as may be the case. Thus, if one employs, for example, toluene and acetic acid, the product(s) can be considered to be an acetate ester of a phenylcarbinol, e.g., benzyl acetate, benzylidene diacetate, etc. Should the reactants be, for instance, toluene and ethanol, the products will be an organic ether(s), e.g., ethyl benzyl ether.

In view of practical, commercial and economic expediencies, it is extremely advantageous and desirable to effect the aforesaid process in the presence of additional anion of organic carboxylic acid or saturated aliphatic alcohol, that is to say, the process is conducted in the presence of an amount of anion of organic carboxylic acid or alcohol which exceeds the anion concentration of the organic carboxylic acid or alcohol itself.

By virtue of the novel process hereinafter described, there is provided a catalytic process in which the catalytic species, e.g., Pd(II), is continuously maintained in its catalytically active form for an indefinite period of time. This is particularly advantageous in the liquid phase benzylic oxidation process of this invention.

By the term "aromaticaliphatic compound having a benzylic hydrogen atom," as used herein, is meant a compound which contains an aromatic nucleus to which is bonded at least one aliphatic radical by a direct linkage between a carbon atom of said aromatic nucleus and an aliphatic carbon atom of said aliphatic radical, said aliphatic carbon atom having at least one free hydrogen atom thereon. The aromatic moiety of the aromaticaliphatic compound can be monocyclic or polycyclic including fused and bridged polycyclic aromatic nuclei. The aromatic nucleus can be a benzenoid ring, e.g., derived from benzene, naphthalene, Tetralin, biphenyl, etc., or it can be a heteroaromatic ring, e.g., derived from pyridine. It is essential that the aliphatic moiety of the aromaticaliphatic compound be characterized by at least one hydrogen atom on the alpha carbon atom. This alpha carbon atom is monovalently bonded to an aromatic ring carbon atom. The aromaticaliphatic compounds are further characterized in that they are free of ethylenic and acetylenic unsaturation, i.e., —C=C— and —C≡C—. The aromaticaliphatic compounds can contain in either or both the aromatic moiety and the aliphatic moiety various substituents or groups which do not preclude or seriously hinder the novel benzylic oxidation reaction, such as nitro; halo, e.g., chloro, bromo, fluoro, and iodo; alkoxy, e.g., methoxy, ethoxy, octoxy, etc.; haloalkyl, e.g., chloromethyl, chloroethyl, etc.; alkylcarbonyloxyalkyl, e.g., methylcarbonyloxymethyl, etc.; acylate, e.g., acetate, propionate, etc.; alkoxyalkyl, e.g., methoxymethyl, etc.; and the like. It is pointed out that the term "aliphatic," as used herein, is employed in its generic sense and thus embraces open-chain as well as cycloaliphatic compounds, radicals, carbon atoms, and the like.

Illustrative aromaticaliphatic compounds which are contemplated in the novel process include the arylalkanes such as the methyl substituted benzenes, e.g., toluene, the xylenes, mesitylene, 1,2,4,5 - tetramethylbenzene, hexamethylbenzene, ethylbenzene, propylbenzene, nitrotoluene, cumene, p-cresol, diphenylmethane, triphenylmethane, p-chloroethylbenzene, and the like; the arylalkyl ethers and the arylalkyl esters, especially the benzyl acylates and the benzyl alkyl ethers such as benzyl acetate, benzyl propionate, phenylethyl 2-ethyl-hexanoate, dibenzyl ether, benzyl phenyl ether, phenylethyl p-tolyl ether, phenyl mesityl ether, benzyl benzoate, phenylpropyl methyl ether, and the like; arylalkylamides especially the benzylamides, e.g., N-benzylacetamide, N-benzylformamide, N-phenylpropylacetamide, and the like; the substituted pyridines (in the 2,3 and/or 4-positions), naphthalenes (in the 1,2,3 and/or 4-positions), phenanthrenes, etc., such as the methylnaphthalenes, the methylphenanthrenes, the 2,3 or 4-methylpyridines, 2-ethyl-5-methylpyridine, and the like. Others include Tetralin, indane, methylanisole, 1,7-dimethylindole, 5 - methylquinoline, 6-methylbenzoxazole, and the like. The foregoing illustrated compounds can contain various substituents indicated and illustrated in the paragraph defining "aromaticaliphatic compound." The arylalkanes, the benzyl ethers, and the benzyl esters are preferred. The methylbenzenes are most preferred with particular emphasis being placed on toluene and the xylenes.

Electron withdrawing substituents on the aromatic or heteroaromatic nucleus of the aromaticaliphatic compound tend to decrease the rate of the benzylic oxidation reaction whereas electron donating substances tend to increase the speed of the reaction. However, it is possible to use in the reaction aromaticaliphatic compounds containing such strongly electron withdrawing substituents as nitro, e.g., para-nitrotoluene, and those containing such strongly electron donating substituents as methoxy, e.g., para-methoxytoluene.

The organic carboxylic acids which are contemplated in the novel process contain up to two carboxyl groups (—COOH) and are free from ethylenic and acetylenic unsaturation. Those acids which contain up to 18 carbon atoms are most desirable in the novel process. Those organic carboxylic acids which consist solely of carbon, hydrogen and oxygen atoms, said oxygen being present in the form of a carbonyloxy group

are desirable. It is to be understood, of course, that the carboxylic acids can contain substituents which do not interfere with the novel process, such as chloro, alkoxy, etc. The saturated hydrocarbon monocarboxylic acids are preferred. Examples of organic carboxylic acids include the alkanoic acids, such as acetic acid, propionic acid, butyric acid, valeric acid, hexanoic acid, heptanoic acid, decanoic acid, dodecanoic acid, and the like; the cycloalkanecarboxylic acids, e.g., cyclohexanecarboxylic acid, cyclopentanecarboxylic acid, and the like; benzoic acid; naphthoic acid; phenylacetic acid; adipic acid; phthalic acid; and the like. The alkanoic acids which have from 1 to 10 carbon atoms and the cycloalkanecarboxylic acids which have from 5 to 7 carbon atoms in the cycloalkane nucleus are preferred. Acetic acid and propionic acid are highly preferred, with acetic acid being especially preferred.

The saturated aliphatic alcohols which are contemplated contain up to two hydroxy groups and preferably contain up to 18 carbon atoms. Those saturated aliphatic alcohols which consist solely of carbon, hydrogen and oxygen atoms, said oxygen atoms being present in the form of an hydroxy group (—OH) are preferred. The saturated aliphatic alcohols can contain substituents which do not interfere with the novel process, e.g., alkyl, cycloalkyl, alkoxy, chloro, bromo, phenyl, and the like. Examples of saturated aliphatic alcohols include the alkanols, such as methanol, ethanol, propanol, butanol, pentanol, hexanol, heptanol, 2-ethylhexanol, decanol, dodecanol, and the like; the cycloalkanols, e.g., cyclohexanol, cyclopentanol, and the like; ethylene glycol; dipropylene glycol; monobutyl ether of diethylene glycol; and others. The alkanols which have from 1 to 10 carbon atoms and the cycloalkanols which have from 5 to 7 carbon atoms in the cycloalkane nucleus are preferred. Methanol, ethanol, and propanol are highly preferred, with ethanol being especially preferred.

The catalyst, e.g., a compound of palladium in its oxidation state of 2, hereinafter referred to as Pd(II), is employed in catalytically significant quantities. A catalyst concentration in the range from about 0.00001 weight percent, and lower, to about 3 weight percent calculated as Pd(II), based on the total weight of the aromatic-aliphatic compound reactant is suitable. A catalyst concentration in the range from about 0.0001 to about 1.0 weight percent calculated as Pd(II) is preferred. For optimum results the nature of the reactants, the operative conditions under which the benzylic oxidation reaction is conducted, the solvent characteristics of the organic carboxylic acid or saturated aliphatic alcohol (and inert, normally liquid organic diluent, if employed), and other factors, will largely determine the desired catalyst concentration. The active catalyst species, i.e., Pd(II), can be derived from a palladium compound which is soluble in the reaction medium (organic carboxylic acid or saturated aliphatic alcohol, etc.) or which can become soluble therein by reaction with one of the components of said medium. Illustrative palladium compounds which may be used include palladium(II) acylate, the anion of which preferably corresponds to the anion of the organic carboxylic acid, for example, the Palladium(II) alkanoates, e.g., palladium(II) acetate, palladium(II) propionate, palladium(II) butyrate, palladium(II) hexanoate, and the like; the palladium(II) cycloalkanecarboxylates, e.g., palladium(II) cyclohexanecarboxylate, and the like; palladium(II) chloride, palladium(II) bromide, palladium(II) nitrate, palladium(II) sulfate, palladium(II) acetylacetonate, ammonium chloropalladate, ammonium chloropalladite, potassium bromopalladite, dichlorodiamminepalladium(II), dinitritodiamminepalladium(II), palladium(II) nitrite, potassium chloropalladate, potassium chloropalladite, sodium chloropalladite, bis-triphenylphosphinepalladium (II) acetate, 1,10-phenanthrolinepalladium(II) acetate, 2,2'-bispyridyl palladium(II) acetate, (N,N,N',N'-tetramethylethylenediamine)palladium(II) acetate, dichlorobis(benzonitrile)palladium(II), and the like; complexes of triarylphosphines and palladium such as tetrakis(triphenylphosphine)palladium(O) which can be oxidized in situ to active palladium; palladium(IV) compounds which can be reduced during the course of the reaction.

It is highly desirable to employ an anti-agglomerant during the reaction in order to prevent any possible deposition or agglomeration of palladium metal especially on the walls of the reaction system or surfaces of other reaction equipment. Examples of anti-agglomerants are the many forms of the aluminas, the carbon blacks, the silicates, silica, etc., which are available commercially and which possess relatively high surface areas, e.g., about several square meter per gram and oftentimes as high as 100 square meters per gram and most preferably even higher than 100 square meters per gram of anti-agglomerant. The amount of anti-agglomerant is not critical. One could employ a ratio of anti-agglomerant to catalyst of from about 10:1, and lower, to about 1000:1, and higher, on a weight basis.

The benzylic oxidation reaction is effected in the presence of sufficient oxidizing agent to maintain the palladium in its catalytically active form, said oxidizing agent being either oxygen, an oxygen-containing gas, or a substance capable of yielding oxygen under the operative conditions of the reaction. Active oxidizers such as peracetic acid, hydrogen peroxide, oxides of nitrogen, sodium peroxide, benzoyl peroxide, chlorine dioxide, may be present in certain cases. To avoid potentially explosive mixtures when employing oxygen, it is oftentimes desirable to dilute the oxygen with an inert gas, e.g., helium. As a practical matter, the concentration of oxidizing agent will depend to a significant extent on the operative pressure, operative temperature, etc. Factors such as residence time, the equipment used, safety factors to be observed, and the like can impose practical considerations. The introduction of oxygen or oxygen-containing gas is preferably effected in such a manner as to insure intimate contact with the liquid phase reaction mixture.

Generally speaking, the concentration of aromatic-aliphatic compound in the reaction mixture is not critical. The practical upper limit of the concentration of said compound is that concentration which adversely decreases the solubility of components of the reaction mixture.

The ratio of aromaticaliphatic compound to organic carboxylic acid or saturated aliphatic alcohol does not appear to be critical. Depending on an interrelationship of variables, such as ionization of the particular organic carboxylic acid or saturated aliphatic alcohol employed, the particular aromaticaliphatic compound employed, the reaction temperature, the presence or absence of MOR' (hereinafter defined), the presence or absence of inert normally-liquid organic diluent, and the like, one can employ as low as 0.1 mole and lower of organic carboxylic acid or saturated aliphatic alcohol per mole of aromatic-aliphatic compound. However, productivity and yield are generally economically unattractive at such low concentrations, and those concentrations, therefore, are not desirable for obvious reasons. In general, at least one mole of acid or alcohol per mole of aromaticaliphatic compound will be suitable. Preferred ratios fall within 2 to 100 moles, and in particular 2 to 40 moles, of acid or alcohol per mole of aromaticaliphatic compound. When no inert normally liquid organic vehicle is employed, the liquid phase contains a major amount, e.g., up to 95 weight percent, and more of the organic carboxylic acid or saturated aliphatic alcohol. Of course, the weight percent of said organic carboxylic acid or saturated aliphatic alcohol diminishes accordingly should one desire to add thereto an inert normally liquid organic diluent.

The concentration of anion of organic carboxylic acid or anion of saturated aliphatic or cycloaliphatic alcohol, depending upon whether one is making benzylic esters or ethers respectively, can be varied over a wide range. For example, for acetic acid the theoretical lower concentration limit would be that which is provided by the ionization of the acetic acid at the operative temperature of the benzylic oxidation reaction. For acetic acid, the concentration of the acetate ion would be $3.9 \times 10^{-7}$ M at 25° C. An upper concentration limit of organic carboxylic acid anion of about 5 moles per liter of homogeneous liquid phase reaction mixture is suitable. Higher concentrations can be used. A concentration in the range of from about $10^{-4}$ to about 4.0 moles of carboxylic acid anion per liter of liquid phase reaction mixture is preferred; from about 0.1 to 3.0 mole per liter is highly preferred.

It is readily apparent from the preceding discussion that since the theoretical upper concentration limit of the organic carboxylic acid anion or aliphatic alcohol anion (both of which can be illustrated by the formula RO—, wherein R is an alkyl, cycloalkyl or acyl radical) is equal to that which would be provided by the ionization of the carboxylic acid or alcohol per se, another source of said anion is necessary in order to raise the upper limit to a concentration which would afford a more practical and commercial benzylic oxidation reaction rate. The preferred sources of additional anion are soluble salts which may be represented by the formula MOR' wherein M is an alkali metal or alkaline earth metal, and R' is a hydrogen atom or an R radical, R being an alkyl, cycloalkyl or acyl radical, said salt being present in an amount up to its saturation level in the reaction mixture. In order to prevent formation of possible mixtures of products caused by the presence of several different anions in the reaction mixture, it is generally desirable, although not required, that the source of additional anion contain the same anion as the organic carboxylic acid or saturated aliphatic alcohol to be used in the reaction. It is generally desirable to add the same anion in order to increase the yield of the main product and to avoid separation of mixtures of many different products. For example, if one adds to a reaction mixture containing a carboxylic acid, e.g., acetic acid, and toluene, an alkali metal salt of a different carboxylic acid, e.g., potassium propionate, there results a mixture of products, in this example acetate and propionate esters, in proportion to the concentration of the different anions in the reaction mixture. However, one can generally add the salt of a weaker protonic acid to a stronger protonic acid and not obtain undesirable mixtures of products. Two examples will serve to illustrate the point. The acidity of, e.g., acetic acid, water and ethanol, decreases in that series from left to right. Anions of stronger protonic acids react preferentially at the benzylic carbon. Therefore, one can add, e.g., sodium hydroxide or sodium ethoxide to a reaction mixture of, e.g., toluene and acetic acid and not obtain generally undesirable mixtures of products containing different types of anions attached to benzylic carbons. However, since a saturated aliphatic alcohol, e.g., ethanol, contains an anion of a protonic acid weaker than either water or a carboxylic acid, e.g., acetic acid, it is generally not desirable to add anions of water, e.g., from sodium hydroxide, or of a carboxylic acid, e.g., from an acetate salt, to a reaction mixture containing an alcohol because these water and acid anions preferentially react at the benzylic carbon, e.g., in toluene, producing respectively alcohols, e.g., benzyl alcohol, and esters, e.g., benzylacetate, before the anion of the alcohol, e.g., ethanol, reacts to produce the desired product, e.g., benzyl ethyl ether. Consequently, a mixture of alcohol or ester and the desired ether would be produced.

The additional carboxylic acid anion concentration can be provided by a soluble carboxylate compound, for instance, a soluble ionic carboxylate compound, which can be added to the reaction medium or which can be generated in situ by the reaction of a basic compound with the organic carboxylic acid, provided that the neutralization product (from the reaction of said basic compound and said acid) does not interfere with the benzylic oxidation reaction, or if said neutralization product does interfere, it is capable of being readily removed from the reaction medium. The basic salts of a strong base and a weak acid, the metal portion of said salts being capable of forming a soluble carboxylate salt in the organic carboxylic acid, are preferred as the additional carboxylic acid anion source. Illustrative basic salts include the alkali metal hydroxides and oxides, e.g., sodium hydroxide, potassium hydroxide, and the like; the Group II metal hydroxides, e.g., barium hydroxide, lead hydroxide, magnesium hydroxide, calcium hydroxide, and the like; the metal salts of organic carboxylic acids, the acid moiety of which corresponds preferably to the anion of the organic carboxylic acid reactant, e.g., the alkali metal carboxylates, such as sodium acetate, potassium acetate, lithium acetate, potassium propionate, sodium propionate and the like; the Group II metal carboxylates, such as barium acetate, zinc acetate, magnesium acetate, cadmium acetate, zinc propionate and the like; various other transition metal carboxylates such as cobalt acetate, nickel acetate, manganese acetate, and the like. Further illustrative basic compounds which are capable of providing the source or means of additional carboxylic acid anion include ammonia; the alkali metal carbonates and oxides, e.g., sodium carbonate, sodium oxide, potassium carbonate, potassium oxide, and the like; the ammonium monocarboxylates such as the ammonium alkanoates, e.g., ammonium acetate, ammonium propionate, and the like; the alkali earth metal oxides and carbonates; the basic organic nitrogen compounds such as the trialkylamines, e.g., trimethylamine, and the like. The additional organic carboxylic acid anion can be supplied by the carboxylate of the catalyst. For example, if acetic acid is the reactant, the additional acetate anion can be supplied by the acetate of the catalyst, e.g., palladium(II) acetate. Carboxylic acid salts of alkali metals and alkaline earth metals are especially preferred as the source of additional carboxylic acid anion.

The additional saturated aliphatic alcohol anion can be provided by a soluble salt of an aliphatic alcohol, which can be added to the reaction medium or which can be generated in situ by the reaction of a basic compound with the saturated aliphatic alcohol, provided that the byproduct of the in situ reaction (of said basic compound and alcohol) does not interfere with the benzylic oxidation reaction, or if said byproduct does interfere, it is capable of being readily removed from the reaction medium. The basic salts of a strong base and a saturated aliphatic alcohol, said salts being soluble in the saturated aliphatic alcohol reactant, are preferred as the additional source of anion of the saturated aliphatic alcohol. Illustrative basic salts include the alkali metal and alkaline earth metal salts of the saturated aliphatic alcohols hereinbefore defined and illustrated.

In summary, the novel benzylic oxidation reaction in highly practical, commercial and preferred aspects is conducted in the presence of an amount of organic carboxylic acid anion or saturated aliphatic alcohol anion which exceeds the anion concentration furnished by the ionization of the carboxylic acid or alcohol under the operative conditions of the process.

The novel benzylic oxidation reaction can be conducted over a wide temperature range and pressure range. The selection of the operative pressure and the operative temperature for optimum results will depend upon various factors, such as the nature of the aromaticaliphatic compound, the nature of the organic carboxylic acid or saturated aliphatic alcohol, the concentration of the reactants, the use of an inert normally liquid organic vehicle, the nature and concentration of the carboxylic anion or the alkoxyl anion, the equipment employed, and the like. Broadly, the reaction temperature can be as low as 20° C., and lower, and as high as 200° C., and higher. A suitable temperature range is from about 50° C. to about 150° C. A reaction temperature of from about 70° C. to 140° C. is preferred. A reaction temperature in the range of from about 80° C. to about 120° C. is most preferred. The operative pressure also can be varied over a wide range, e.g., from slightly below atmospheric pressure to superatmospheric pressures. In general, it is desirable to employ a total pressure which is at least equal to one atmosphere. It is preferred, however, that the total pressure be slightly greater than one atmosphere. Pressures as high as 300 atmospheres, and higher, can be tolerated and are oftentimes desirable. A total pressure up to about 100 atmospheres is highly preferred. The pressure to be used will be dictated by the equipment, the vapor pressure of the reactants, and the concentration of oxygen or oxygen-containing gas employed in the reaction mixture.

The benzylic oxidation reaction is conducted for a period of time which is sufficient to replace at least one benzylic hydrogen atom from the aromaticaliphatic compound with, e.g., -RO—, which represents the carboxylic acid reactant when R is an acyl radical or the aliphatic alcohol reactant when R is an alkyl or cycloalkyl radical, said reactants lacking the active hydrogen from the respective carboxyl or hydroxyl group, as may be the case. The reaction period can range from several seconds to several hours, e.g., about 24 hours, and longer, depending upon the correlation of factors noted previously. A residence period of from about 10 minutes to 10 hours appears to be suitable in instances.

The benzylic oxidation reaction is accomplished in the liquid phase. It is highly desirable to effect the reaction in the essential absence of impurities which tend to inactivate the catalyst. When an organic carboxylic acid is employed as a reactant, moderate amounts of water or other weaker protonic acids may be present in the reaction mixture without adversely affecting the reaction. As is apparent from the operative examples, the benzylic oxidation reaction can be conducted in the presence or absence of added water when employing an organic carboxylic acid as a reactant. When a saturated aliphatic alcohol is employed as a reactant, appreciable concentrations of protonic acids stronger than the alcohol are undesirable.

If desired, the novel process can be effected in the presence of an inert, normally liquid organic diluent or vehicle which is an organic polar compound capable of enhancing the solubility of the metal salts in the liquid reaction mixture. These vehicles, of course, are inert with respect to the reactants and products. This enhanced solubility can serve to significantly increase the benzylic oxidation reaction rate and also to increase the productivity of the reaction system. Illustrative inert, normally liquid organic vehicles include, for example the hydrocarbon nitriles, e.g., acetonitrile, propionitrile, and the like; the N,N-dialkyl-alkanamides, e.g., N,N-dimethylacetamide and the like; the dialkyl and the cyclic carbonates, e.g., diethyl carbonate, ethylene carbonate, and the like.

Although halide ion may be tolerated in the benzylic oxidation reaction, it may tend to retard the reaction rate. Therefore, it is desirable to conduct the novel process in an essentially halide ion free system, that is to say, in a system containing less than 50 parts per million (p.p.m.) of halide ion and preferably less than 10 p.p.m. of halide ion. By operating the novel process in accordance with this preferred embodiment several pronounced advantages are obtained. From commercial standpoints the novel process can be conducted with equipment constructed of, for example, stainless steel which would otherwise be readily attacked by halide ion. In order for a system to tolerate even a relatively small amount of halide ion, one must resort to equipment fabricated from prohibitively expensive materials such as Hastelloy or titanium. In addition, a catalyst source such as palladium (II) acylate, e.g., palladium(II) acetate, or palladium(II) acetylacetonate, palladium(II) nitrate, etc., is relatively more soluble in the liquid reaction mixture than would be the case with, for example, palladium(II) dichloride. This can result in faster reaction rates and can increase the productivity of the reaction system. Moreover, the obvious commercial disadvantages which would result from the formation of halogenated organic byproducts are eliminated in this embodiment.

It has been found that the rate of the reaction can be unexpectedly and greatly enhanced by the addition of certain other compounds which are soluble in the reaction mixture. These compounds are hereinafter referred to as catalyst modifiers. Catalyst modifiers useful in the process of this invention are the compounds of tin, geranium, phosphorous, arsenic or antimony which are soluble in the reaction mixture.

Among the many types of tin compounds which may be used are: the stannous carboxylates such as stannous acetate, stannous octanoate, stannous laurate, stannous 2-ethylhexanoate, stannous butyrate, stannous cyclohexanecarboxylate, stannous tartrate, stannous citrate, stannous benzoate, stannous gluconate, stannous naphthenate, stannous oleate, etc.; stannous halides such as stannous bromide, stannous chloride; tin oxides and hydrous oxides; ammonium trichlorostannite, stannous nitrate, and potassium trichlorostannite; and the like. Tin metal, preferably in finely divided form, may be used to produce a suitable tin compound in situ. Other stannous compounds such as stannous acetylacetonate, stannous sulfate, potassium triacetatostannite and similar chelate compounds and salts of Sn(II) may also be used.

The source of active tin compound may also be a compound of tin(IV) such as stannic acetate, stannic cloride, ammonium hexachlorostannate, lithium hexachlorostannate, etc. Tin(IV) compounds having the general formula $R_4Sn$, $R_3SnX$, $R_2SnX_2$ and $RSnX_3$, wherein R represents hydrocarbyl, such as alkyl, aralkyl, aryl, alkaryl and cycloalkyl or alkoxy and X represents halide, hydride, hydroxyl, alkoxy or acyloxy and $X_2$ may represent oxygen, which are readily soluble in organic solvents and many of which are commercially available, may be used; the active tin compound being generated in situ. Illustrative of this class of tin compounds are trimethyltin hydroxide, trimethyltin chloride, triphenyltin chloride, dimethyltin diacetate, diethyltin diacetate, dioctyltin diacetate, dilauryltin diacetate, dibutyltin dilaurate, dimethyltin dichloride, diphenylin dichloride, diallyltin dibromide, butyltin trichloride, octyltin trichloride, butyltin triacetate, dimethyltin oxide, dibutyltin oxide, dilauryltin oxide, and diphenyltin oxide, dibutyltin dibutoxide, tributyltin hydride, dibutyltin succinate, triethyltin acetate, triethyl-(2-hydroxyethyl) tin, tetra-n-butyltin, diphenyldiethyltin, and the like.

Other tin compounds which may be used as the source of the tin catalyst modifier are the metal stannites, for example $Li_2SnO_2$; the alkyl and aryl stannonic acids and their salts, for example, n-octylstannonic acid, and lithium cyclohexylstannonate, and the like; tin amide compounds such as triethyltin methanesulfonamide, and the like. The metal stannates such as $K_2SnO_3$, $ZnSnO_3$, and the like; ethers of tin hydroxides such as triethyltin oxide and the like; stannanes such as hexaethylstannane, and the like.

In general, tin metal and compounds of Sn(II) and Sn(IV) having appreciable solubility in the reaction medium can be used as a source of the active tin species. It is preferred to use finely divided tin metal or a simple stannous compound. Stannous alanoates and stannous acetylacetonate are most preferred.

The soluble phosphorous compounds useful as catalyst modifiers include the trihydrocarbylphosphines, the trihydrocarbylphosphine oxides, the trihydrocarbylphosphites, and the hydrocarbyl esters of phosphoric acid. Corresponding compounds of arsenic and antimony may also be used.

Illustrative of the trihydrocarbylphosphines are the trialkylphosphines, e.g., trimethylphosphine, triethylphosphine, tripropylphosphine, tributylphosphine, and the like; the triarylphosphines, e.g., triphenylphosphine, tritolylphosphine, and the like; and the mixed phosphines containing both aryl and alkyl radicals, e.g., dimethylphenylphosphine, ethyldiphenylphosphine, and the like. The corresponding trihydrocarbylphosphine oxides are also useful catalyst modifiers. Illustrative of the trihydrocarbylphosphites are the trialkylphosphites, e.g., trimethylphosphite, triethylphosphite, tri-n-butylphosphite, and the like; triarylphosphites, for example, triphenylphosphite, tritolylphosphite, and the like; and the mixed phosphites containing both alkyl and aryl radicals, e.g., dimethylphenyl phosphite, ethyldiphenylphosphite, and the like. Illustrative of the esters of phosphoric acid are the alkyl phosphates, aryl phosphates, and alkyl aryl phosphates, such as: triethylphosphate, tri-n-octylphosphate, tri-n-butylphosphate, tri-2-ethylhexylphosphate, triphenylphosphate, tri-p-tolylphosphate, n-butyldiphenylphosphate, and the like.

While some benefit is obtained from using less than one mole of catalyst modifier per mole of catalyst, it is generally desirable to use at least about one mole of catalyst modifier per mole of catalyst and preferably to use more than one mole up to about ten moles of catalyst modifier per mole of catalyst in most instances. In some instances higher ratios, for example, up to about 100 moles of modifier per mole catalyst, and higher, may be desirable.

In an extremely preferred aspect, the invention is directed to a novel catalytic composition containing Pd(II) and the catalytic modifier explained above, in a liquid medium. The significance of the aforesaid novel composition cannot be overlooked since said composition when employed in the novel processes gives many of the advantages discussed previously in detail. In a more preferred aspect, part or all of the liquid medium of the aforesaid novel composition is an organic carboxylic acid which is free from ethylenic and acetylenic unsaturation. In a still more preferred aspect, the preceding novel compositions are essentially anhydrous. In a yet more preferred aspect, the preceding novel compositions contain additional organic carboxylic acid anion. A still further preferred aspect is directed to the aforesaid novel composition in which all or part of the liquid medium is an inert normally liquid organic vehicle. These novel compositions taken singly or collectively, when employed in the novel processes described above, give several or all of the advantages discussed throughout the specification. The scope and concentration of the catalyst, the catalyst modifier, the saturated aliphatic alcohol or organic carboxylic acid, the additional anion of organic carboxylic acid or saturated aliphatic alcohol, the inert normally liquid organic vehicle, etc. have been illustrated previously.

The novel process can be executed in a batch, semicontinuous or continuous fashion. Equipment can be fabricated of glass, metal, alloy, etc., to best suit the particular and individual needs of the design and contemplated operative conditions. The reaction product mixture can be resolved into its components via conventional techniques such as by distillation, fractionation, extraction, and so forth.

A typical subclass of aromaticaliphatic compounds useful in the novel process may be represented by the formula:

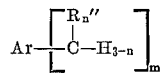

wherein Ar represents an aromatic nucleus; R″ is a monovalent hydrocarbon radical free from ethylenic and acetylenic unsaturation; $n$ is 0, 1 or 2 and $m$ has a value of at least one, its upper limit being governed by the number of aliphatic moieties bonded to the Ar nucleus, preferably 1 to 6 and most preferably 1 to 4. Illustrative compounds within this subclass are listed hereinabove.

The reaction of ROH wherein R is an alkyl, cycloalkyl or acyl radical, with a compound of the above typical subclass of aromaticaliphatic compound could be represented by the following equation:

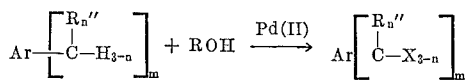

in which X represents hydrogen or RO—, with the proviso that at least one X in the product represents RO—.

Illustrative products of the equation shown above are:

benzyl acetate,
benzylidene diacetate,
benzyl propionate,
benzylidene dipropionate,
benzyl butyrate,
benzylidenedibutyrate,
benzyl benzoate,
benzylidenedibenzoate,
ethyl benzyl ether,
propyl benzyl ether,
butyl benzyl ether,
α-methylbenzylacetate,
α-ethylbenzylacetate,
p-methylbenzyl acetate,
α,α′-p-xylene diacetate,
p-methylbenzylidene diacetate,
2,4,5-trimethylbenzyl acetate,
1,4-bis(acetoxymethyl)-2,5-dimethylbenzene,
p-chlorobenzyl acetate,
p-methoxybenzyl acetate,
p-nitrobenzyl butyrate,
p-methylbenzyl methyl ether,
1-acetoxymethylnaphthalene,
3-acetoxymethylpyridine,
p,p′-bis(acetoxymethyl)biphenyl,
diphenylcarbinol acetate,
phenyl-2-bicyclo[2.2.1]heptylcarbinol acetate,
p-phenylbenzylidene dibutyrate,
2,4-diketo-3,3-dimethyl-6-phenyl-1,5-dioxacyclohexane,
2-phenyldioxalane,
benzyl laurate,
benzaldehyde diethyl acetal,
p-methylbenzyl cetyl ether,
and the like.

Other metal species, in addition to Pd(II), are capable of catalyzing the benzylic oxidation reaction. Such metals are the noble metals of Group VIII of the Periodic Table of the Elements—platinum, ruthenium, rhodium and iridium—and should be in an oxidation state greater than zero.

It has been noted that a relatively strong protonic acid (a carboxylic acid, e.g., acetic acid) or a weak protonic acid (an aliphatic alcohol, e.g., ethanol) can be used in the novel process of the invention. A protonic acid of a strength between those of these two protonic acids can also be used. Such a protonic acid is water. If water were used in the novel process, there would be produced an alcohol containing a hydroxyl on the benzylic carbon of the aromaticaliphatic compound. Further oxidation would produce the corresponding aldehyde or ketone.

If benzylidene diesters are formed when an organic carboxylic acid is used in the novel process, they can decompose to give the corresponding aldehyde as a secondary product. The same is true of acetals, if formed, when an aliphatic alcohol is used as a reactant.

The products of the novel process have a wide utility. Some are useful as intermediates for pharmaceuticals and agricultural chemicals, as plasticizers, as monomers and in cosmetics, etc.

The term "methyl substituted benzenes" as used herein refers to benzene substituted with from 1 to 6 methyl radicals.

EXAMPLE 1

Each of ten experiments was conducted according to the following procedure. To a 1-liter flask equipped with a stirrer and reflux condenser, there were charged the ingredients shown in Tables I and II which follow, i.e., toluene, acetic acid, KOAc, Pd(O) on charcoal or Pd(OAc)$_2$ and charcoal, and Sn(OAc)$_2$ were used, in the amounts indicated in the tables. The resulting mixture was stirred well and heated for six hours at 100° C. while air was blown over the surface of the mixture at a rate of 500 ml./min.

Percent conversions of toluene and rates of formation of benzyl acetate determined by vapor phase chromatographic analysis are given in the tables.

TABLE I.—REACTIONS OF TOLUENE WITH 5% PALLADIUM(O) ON CHARCOAL AND AIR AT 100° C.

| Experiment | Toluene (moles) | Acetic acid (moles) | KOAc (moles) | Pd (moles) | Sn(OAc)$_2$ (moles) | Benzyl acetate Millimoles/l./hr. | Benzyl acetate Moles/mole Pd/hr. | Percent conversion of toluene * |
|---|---|---|---|---|---|---|---|---|
| 1 | 1.2 | 8.04 | 1.10 | 0.004 | 0.06 | 78 | 11.65 | 23 |
| 2 | 1.2 | 8.04 | 1.10 | 0.008 | 0.06 | 142 | 10.67 | 45 |
| 3 | 1.2 | 8.04 | 1.10 | 0.016 | 0.06 | 203 | 7.60 | 64 |
| 4 | 1.2 | 8.04 | 1.10 | 0.032 | 0.06 | 196 | 3.68 | 60 |
| 5 | 1.2 | 8.04 | 1.10 | 0.016 | | | | Trace |

* These figures are based on the amounts of benzyl acetate and benzylidene diacetate formed.

TABLE II.—REACTIONS OF TOLUENE WITH PALLADIUM(II) ACETATE AND AIR IN THE PRESENCE OF CHARCOAL AT 100° C.

| Experiment | Toluene (moles) | Acetic acid (moles) | KOAc (moles) | Pd(OAc)$_2$ (moles) | Sn(OAc)$_2$ (moles) | Charcoal (grams) | Benzyl acetate Millimoles/l./hr. | Benzyl acetate Moles/mole Pd/hr. | Percent conversion of toluene * |
|---|---|---|---|---|---|---|---|---|---|
| 6 | 1.2 | 8.04 | 1.10 | 0.004 | 0.06 | 8.4 | 124 | 18.50 | 38 |
| 7 | 1.2 | 8.04 | 1.10 | 0.008 | 0.06 | 16.8 | 187 | 14.06 | 58 |
| 8 | 1.0 | 8.04 | 1.10 | 0.016 | 0.06 | 33.6 | 235 | 8.80 | 80 |
| 9 | 1.0 | 8.04 | 1.10 | 0.032 | 0.06 | 67.7 | 173 | 3.24 | 53 |
| 10 | 1.2 | 8.04 | 1.10 | 0.016 | | 33.6 | 25 | 0.93 | 7 |

* These figures are based on the amounts of benzyl acetate and benzylidene diacetate formed.

The results of Experiment 5 (Table I) and Experiment 10 (Table II) should be noted. From these results it will be seen that whereas 0.016 mole of palladium(O) dispersed on charcoal converted only a trace of the toluene present in Experiment 5, 0.016 mole of palladium(II) acetate converted 7% of the toluene present in Experiment 10.

Each table also illustrates one of the preferred embodiments of the invention, viz, the use of a catalyst modifier in conjunction with either palladium(O) or palladium (II). It will be noted that whereas the use of palladium(O) without Sn(OAc)$_2$ in Experiment 5 resulted in the conversion of essentially no toluene, the use of palladium(O) with Sn(OAc)$_2$ in otherwise similar Experiment 3 unexpectedly resulted in the conversion of 64% of the toluene. Experiment 8 is similar to Experiment 10 except that slightly less toluene was used in the former experiment. Experiments 8 and 10 nevertheless show an approximately tenfold increase in conversion of toluene when a small amount of Sn(OAc)$_2$ was used in conjunction with palladium(II).

Examples 2 to 4 which follow show further that the active catalyst is a compound of Pd(II). In addition, Example 4 shows the increased yield obtained when a catalyst modifier, in that example stannous acetate, is used in conjunction with a Pd(II) catalyst even in this simple system.

EXAMPLE 2

To a 100 ml. flask, equipped with a stirrer and reflux condenser, was charged 2.25 g. of palladium(II) acetate and 18.4 g. of toluene. The resulting mixture was stirred and refluxed for 3 hours. Benzyl acetate and benzylidene diacetate were produced in 12.0% and 0.9% yields, respectively, based on palladium(II) acetate charged.

EXAMPLE 3

This reaction was carried out exactly as in the preceding example except that 6.6 g. of lithium acetate was included in the charge. Analysis showed that 15.3% of benzyl acetate and 1.9% of benzylidene diacetate, based on palladium(II) acetate, were formed.

EXAMPLE 4

This reaction was carried out exactly as in the preceding example except that 2.37 g. of stannous acetate was charged instead of the lithium acetate. Analysis showed that a 35.3% yield (based on palladium(II) acetate) of benzyl acetate, as well as 1.5% of benzylidene diacetate, was obtained.

EXAMPLE 5

To a 250 ml. flask, equipped as above, was charged 9.2 g. of toluene, 2.25 g. of palladium(II) acetate, 22.7 g. of potassium acetate, and 100.0 g. of acetic acid. The resulting mixture was heated at 100° for 24 hours.

Benzaldehyde was formed in 10% yield (based on palladium(II) acetate), along with 108% benzyl acetate and 9.2% benzylidene diacetate.

EXAMPLE 6

To a 500 ml. flask, equipped as above, was charged 200 g. of acetic acid, 10 g. of toluene, 1.0 g. of palladium (II) acetate, and 1.0 g. of stannous acetate. The reaction mixture was stirred and heated at 100° C. for 3 hours.

Analysis showed that 9.9% (based on palladium(II) acetate) of benzaldehyde, 181.7% of benzyl acetate, and 11% of benzylidene diacetate were formed.

EXAMPLE 7

To a 250 ml. flask, equipped with a high-speed stirrer and a reflux condenser, was charged 9.2 g. of toluene, 14.7 g. of potassium acetate, 1.0 g. of palladium(II) acetate, 1.0 g. of stannous acetate, and 50.0 g. of acetic acid. The resulting mixture was stirred vigorously and heated at 100° C. for 3 hours while air was blown through the flask.

Analysis showed that 537% (based on palladium(II) acetate) of benzyl acetate and 127.4% of benzylidene diacetate were produced.

EXAMPLE 8

To a 1-liter flask, fitted with a reflux condenser and a stirrer, was charged 482.0 g. of acetic acid, 108.4 g. of potassium acetate, 109.3 g. of toluene, 14.2 g. of stannous acetate, 0.9 g. of palladium(II) acetate, and 8.4 g. of charcoal. The resulting mixture was heated at 100° C. for 6 hours with stirring and with air blowing through the flask at a rate of 500 ml./min.

Benzyl acetate was produced at a rate of 124 millimoles/liter/hour and benzylidene diacetate at 6.5 millimoles/liter/hour.

EXAMPLE 9

To a 1-liter flask, equipped as above, was charged 482.0 g. of acetic acid, 108.4 g. of potassium acetate, 3.6 g. of palladium(II) acetate, and 16.3 g. of alumina. The mixture was first stirred and heated at 100° C. for 24 hours in a nitrogen atmosphere, then for 24 hours with air blowing through the flask at a rate of 100 ml./min. Under the latter conditions, 109.3 g. of toluene was added and after 5 hours a 212% yield (based on palladium(II) acetate) of benzyl acetate was obtained.

EXAMPLE 10

To a 250 ml. flask, equipped with a stirrer and reflux condenser, there were charged 9.2 g. of toluene, 2.25 g. of palladium(II) acetate, 22.7 g. of potassium acetate, 18.0 g. of water, and 100.0 g. of acetic acid. The resulting mixture was stirred and heated at 100° C. for 3 hours.

Analysis showed that 90.0% (based on palladium(II) acetate) of benzyl acetate and 17.4% of benzylidene diacetate were produced.

EXAMPLE 11

To a 250 ml. flask, equipped with a stirrer and reflux condenser, there were charged 9.2 g. of toluene, 2.25 g. of palladium(II) acetate, 22.7 g. of potassium acetate, and 100.0 g. of acetic acid. The resulting mixture was stirred and heated at 100° C. for three hours.

Analysis showed that 63.2% (based on palladium(II) acetate) of benzyl acetate and 6.8% of benzylidene diacetate were formed.

An identical reaction, except that 7.3 g. of copper(II) acetate was added to the charge, gave only 4.6% yield of benzyl acetate, illustrating the undesirable effect of the presence of copper(II) acetate.

Another reaction, containing 9.2 g. of toluene, 1.0 g. of palladium(II) acetate, 14.7 g. of potassium acetate, 200.0 g. of acetic acid, 7.3 g. of copper(II) acetate, and 1.0 g. of stannous acetate, gave 7.6% benzaldehyde, 83.4% benzyl acetate, and 19.2% benzylidene diacetate. This reaction shows the increase in rate caused by the presence of stannous acetate.

The undesirable effect of copper(II) acetate is further exemplified by the fact that when copper(II) acetate was removed from the above example, 9.6% benzaldehyde, 190.0% benzyl acetate, and 22.6% of benzylidene diacetate were formed.

EXAMPLE 12

To a 250 ml. flask, fitted with a condenser, stirrer, and thermometer, there were charged 9.2 grams (0.1 mole) of toluene, 2.25 grams (0.01 mole) of palladium(II) acetate, 22.7 grams (0.23 mole) of potassium acetate, and 100 grams (1.67 moles) of glacial acetic acid. The resulting mixture was stirred and heated at 100° for 24 hours.

Analysis of the product mixture by vapor phase chromatography showed that it consisted of 7.4% benzaldehyde, 85.4% benzyl acetate, and 7.2% benzylidene diacetate.

EXAMPLE 13

To a 250 ml. flask, fitted with a condenser, stirrer, and thermometer, there were charged 10.6 grams (0.1 mole) of ethylbenzene, 2.25 grams (0.01 mole) of palladium(II) acetate, 22.7 grams (0.23 mole) of potassium acetate, and 100 grams (1.67 moles) of glacial acetic acid. The resulting mixture was stirred and heated at 100° for 3 hours.

Analysis of the reaction mixture by vapor phase chromatography showed that $\alpha$-methylbenzyl acetate was the major product obtained.

EXAMPLE 14

This reaction was carried out exactly as in Example 13 above except that 10.6 grams (0.1 mole) of p-xylene was used instead of ethylbenzene.

Analysis of the product mixture by vapor phase chromatography showed that it consisted of 6.3% p-methylbenzaldehyde, 2.8% p-methylbenzylidene diacetate, 51.1% p-methylbenzyl acetate, and 39.4% p-xylene $\alpha,\alpha'$-diacetate.

EXAMPLE 15

This reaction was carried out exactly as in Example 3 above except that 12.0 grams (0.1 mole) of p-methylanisole was used instead of ethylbenzene.

Analysis of the product mixture by vapor phase chromatography showed that it was mainly p-methoxybenzyl acetate, along with a trace of p-methoxybenzaldehyde.

EXAMPLE 16

The reaction was carried out exactly as in Example 5, except that 13.7 grams (0.1 mole) of p-nitrotoluene was used instead of p-methoxytoluene.

Analysis of the reaction mixture by vapor phase chromatography showed that p-nitrobenzyl acetate was present after three hours.

EXAMPLE 17

To a 250 ml. flask, fitted with a condenser, stirrer, and thermometer, there were charged 9.2 grams (0.1 mole) of toluene, 25.8 grams (0.23 mole) of potassium propionate, 4.5 grams (0.02 mole) of palladium(II) acetate, and 125 grams (1.67 moles) of propionic acid. The resulting mixture was stirred at 100° for 4 hours.

Analysis of the reaction mixture showed that it contained 3.8% (based on palladium(II) acetate) benzaldehyde, 1.7% benzyl acetate, and 54.2% benzyl propionate.

EXAMPLE 18

To a 500 ml. flask, fitted with a condenser, stirrer, and thermometer, there were charged 36.8 grams (0.4 mole) of toluene, 36.8 grams (0.46 mole) of lithium propionate, 7.1 grams (0.03 mole) of stannous acetate, 17.2 grams of 5% palladium(O) on charcoal (0.008 mole of Pd), and 250 grams (3.34 moles) of propionic acid. The resulting mixture was stirred at 100° under a continuous air flow for six hours.

Analysis of the product mixture by vapor phase chromatography showed that the mixture was composed of 4.5% benzaldehyde, 2.3% benzyl acetate, and 93.2% benzyl propionate.

EXAMPLE 19

To a 250 ml. flask, fitted with a condenser, stirrer, and thermometer, there were charged 9.2 grams (0.1 mole) of toluene, 1.0 gram (0.004 mole) of palladium(II) acetate, 1.0 gram (0.004 mole) of tin(II) acetate, 50.0 grams (0.84 mole) of glacial acetic acid, and 15.0 grams (0.15 mole) of potassium acetate. The resulting mixture was stirred under a continuous air flow at 100° for 3 hours.

Analysis of the reaction mixture by vapor phase chromatography showed that 26% of the toluene charged was oxidized to a mixture of 80.5% benzyl acetate and 19.5% benzylidene diacetate.

EXAMPLE 20

To a 1 l. flask, fitted with a condenser, stirrer, and thermometer, there were charged 482.0 grams (8.04 moles) of glacial acetic acid, 106.0 grams (1.0 mole) of ethylbenzene, 108.4 grams (1.10 moles) of potassium acetate, 14.2 grams (0.06 mole) of stannous acetate, 3.6 grams (0.016 mole) of palladium(II) acetate, and 33.6 grams of charcoal. The resulting mixture was stirred and heated at 100° under a continuous air flow for 25 hours.

Analysis of the reaction product by vapor phase chromatography showed that it consisted of 2.0% phenylacetaldehyde, 4.5% acetophenone, 43.3% $\alpha$-methylbenzyl acetate, 14.4% $\beta$-phenylethyl acetate, 16.4% cis-styryl acetate, and 19.4% trans-styryl acetate.

EXAMPLE 21

To a 1 l. flask, fitted with a condenser, stirrer, and thermometer, there were charged 25.3 grams (1.1 moles) of sodium metal and 414.0 grams (9.0 moles) of absolute ethanol. When all the sodium had reacted, 110.4 grams (1.2 moles) of toluene, 14.2 grams (0.06 mole) of stannous acetate, and 34.4 grams of 5% palladium(O) on charcoal (0.016 mole Pd) were added, and the resulting mixture was stirred and refluxed at 70° under a continuous air flow for 4¼ hours.

Analysis of the reaction mixture by vapor phase chromatography demonstrated the presence of benzyl ethyl ether.

EXAMPLE 22

To a 1-liter flask, equipped with a stirrer and reflux condenser, was charged 482.0 g. of acetic acid, 108.4 g. of potassium acetate, 109.3 g. of toluene, 3.6 g. of palladium(II) acetate, and 33.6 g. of charcoal. The resulting mixture was stirred vigorously and heated at 100° while air was blown through the flask at a rate of 500 ml./min.

Analysis of the reaction mixture after 6 hours showed that benzyl acetate was produced at a rate of 25 millimoles/liter/hour.

EXAMPLE 23

Using the same apparatus as in the above example, as well as the same amounts of reactants except for palladium (II) acetate and charcoal, which were charged to 0.9 g. and 8.4 g., respectively, and the addition of 14.2 g. of stannous acetate, the same reaction conditions produced benzyl acetate at a rate of 124 millimoles/liter/hour, along with benzylidene diacetate at a rate of 6 millimoles/liter/hour.

EXAMPLE 24

To a 1-liter flask, equipped with a stirrer and reflux condenser, was charged 482.0 g. of acetic acid, 108.4 g. of potassium acetate, 92.1 g. of toluene, 14.2 g. of stannous acetate, 3.6 g. of palladium(II) acetate, and 33.6 g. of charcoal. The resulting mixture was stirred vigorously and heated at 100° while air was blown through the flask at a rate of 500 ml./min.

Complete conversion of toluene occurred between 5 and 6 hours of reaction time, with benzyl acetate being produced at a constant rate of 235 millimoles/liter/hour along with benzylidene diacetate at a rate of 12 millimoles/liter/hour, and only a trace ($<$1 millimole/liter/hour) of benzoic acid.

EXAMPLE 25

Using the same apparatus as in the above example, as well as the same amounts of reactants, except for palladium(II) acetate and toluene, which were charged to 1.8 g. and 109.3 g., respectively, and the absence of charcoal, the same reaction conditions produced benzyl acetate at a rate of 125 millimoles/liter/hour, along with benzylidene diacetate at a rate of 8 millimoles/liter/hour.

EXAMPLE 26

To the above apparatus was charged 482.0 g. of acetic acid, 92.1 g. of toluene, 108.4 g. of potassium acetate, 14.2 g. of stannous acetate, 2.85 g. of palladium(II) chloride, and 33.6 g. of charcoal. The resulting mixture was stirred vigorously and heated at 100° C. for 6 hours, while air was blown through the flask at a rate of 500 ml./min.

Analysis of the reaction mixture showed that benzyl acetate was produced at a rate of 68 millimoles/liter/hour, along with benzylidene diacetate at a rate of 1.3 millimoles/liter/hour. Although trace amounts could have been detected, no dimeric products were observed in the reaction mixture.

EXAMPLE 27

Using the same apparatus as above, and substituting 3.6 g. of palladium(II) acetate and 7.8 g. of lithium chloride for the palladium(II) chloride used in the previous example, the same reaction conditions produced benzyl acetate at a rate of 75 millimoles/liter/hour, along with benzylidene diacetate at a rate of 3 millimoles/liter/hour. Although trace amounts could have been detected, no dimeric products were observed in the reaction mixture.

EXAMPLE 28

To a 1-liter flask, equipped with a stirrer and reflux condenser, was charged 482.0 g. of acetic acid, 110.4 g. of toluene, 108.4 g. of potassium acetate, 1.8 g. of palladium(II) acetate, 13.5 g. of stannous chloride, and 2.55 g. of lithium chloride. The resulting mixture was stirred vigorously and heated at 100° C. for 6 hours while air was blown through the flask at a rate of 500 ml./min.

Analysis of the product mixture showed that benzyl acetate was produced at a rate of 27 millimoles/liter/hour. Although trace amounts could have been detected, no dimeric products were observed in the reaction mixture.

EXAMPLE 29

To a 1-liter flask, equipped as above, was charged 482.0 g. of acetic acid, 109.3 g. of toluene, 108.4 g. of potassium acetate, 15.7 g. of triphenylphosphine, and 1.8 g. of palladium(II) acetate. After stirring and heating at 100° C. for 6 hours, while air was blown through the flask at a rate of 500 ml./min., analysis showed that benzyl acetate was made at a rate of 58.6 millimoles/liter/hour and benzylidene diacetate at a rate of 6.5 millimoles/liter/hour.

EXAMPLE 30

This reaction was run exactly like the preceding example except that 4.98 g. of triethylphosphite was used instead of triphenylphosphine and the amounts of all the other reactants were halved. Analysis showed that 35% (based on palladium(II) acetate) of benzaldehyde, 1038% of benzyl acetate, and 150% of benzylidene diacetate were formed.

EXAMPLE 31

This reaction was run exactly like the preceding example except that 8.4 g. of triphenylphosphine oxide was used instead of triethylphosphite, and 16.8 g. of charcoal was added after 3 hours of reaction time. After 6 hours, 149% (based on palladium(II) acetate) of benzyl acetate was produced.

EXAMPLE 32

This reaction was run exactly like the preceding example except that 10.9 g. of triethylphosphate was used instead of triphenylphosphine oxide. After 6 hours, 348% (based on palladium(II) acetate) of benzyl acetate, and 11% of benzylidene diacetate were produced.

EXAMPLE 33

To a 250 ml. flask, equipped as above, was charged 50.0 g. of acetic acid, 27.6 g. of toluene, 19.6 g. of potassium acetate, and 1.0 g. of tetrakis-triphenylphosphine palladium(O). The reaction mixture was stirred and heated at 100° C. for 48 hours while air was blown through the flask. Analysis showed that 13.2 moles of benzyl acetate were produced per mole of palladium charged, as well as a small amount of benzylidene diacetate.

EXAMPLE 34

To a 1-liter flask, equipped with stirrer and condenser, there were charged 482.0 g. of acetic acid, 108.4 g. of potassium acetate, 14.2 g. of stannous acetate, 90.0 g. of benzyl acetate, 3.6 g. of palladium(II) acetate and 33.6 g. of charcoal. The reaction mixture was heated at 100° C. and stirred well for 6 hours while air was passed over the surface of the mixture at a rate of 500 ml./min.

The benzyl acetate was oxidized at a rate of 80 millimoles/liter/hour to produce a mixture of benzylidene diacetate and its decomposition products, benzaldehyde and acetic anhydride.

EXAMPLE 35

The reaction in Example 34 was repeated, but 106.0 g. of p-xylene was charged instead of benzyl acetate.

Vapor phase chromatographic analysis showed that 125% (based on palladium(II) acetate) of p-methylbenzaldehyde, 1,210% of p-methylbenzyl acetate, and 720% of $\alpha,\alpha'$-p-xylene diacetate were formed.

EXAMPLE 36

The reaction described in Example 35 was repeated, but 13.4 g. of durene was charged instead of p-xylene and the amounts of all the other reactants were halved.

After heating at 100° C. for 22 hours, analysis showed that 164% (based on palladium(II) acetate) of durene monoacetate was formed. An infrared spectrum of the product showed an aliphatic ester band at 1745 cm.$^{-1}$ and an acetate band at 1240 cm.$^{-1}$. A nuclear magnetic resonance spectrum of the product showed the presence of benzylic hydrogens adjacent to an acetate group by a resonance line at $\tau = 5.01$.

EXAMPLE 37

The reaction described in Example 36 was repeated, but 16.2 g. of hexamethylbenzene was charged instead of durene.

Analysis showed that 151% (based on palladium(II) acetate) of hexamethylbenzene monoacetate was formed. An infrared spectrum of the product showed an aliphatic ester band at 1740 cm.$^{-1}$ and an acetate band at 1250 cm.$^{-1}$.

What is claimed is:

1. A liquid phase process for the preparation of arylalkyl esters of carboxylic acids which comprises contacting an alkylaromatic hydrocarbon having an aromatic nucleus to which is bonded at least one alkyl radical by direct linkage between a carbon atom of said aromatic nucleus and a carbon atom of said alkyl radical, said alkyl carbon atom having at least one free hydrogen atom thereon with oxygen and a saturated hydrocarbon carboxylic acid containing up to two carboxyl groups and up to 18 carbon atoms in the presence of a catalyst consisting essentially of a palladium(II) salt or a palladium(II) salt plus a modifier soluble in the carboxylic acid reaction medium selected from the group consisting of: a stannous salt; a trihydrocarbylphosphine, a trihydrocarbylphosphine oxide, a trihydrocarbylphosphite, a trihydrocarbylphosphate in which the hydrocarbyl radicals are alkyl or aryl; and a soluble salt of the Formula MOR, wherein M is an alkali or alkaline earth metal and R is alkyl or acyl derived from said hydrocarbon carboxylic acid at about 20–200° C. for a period of time sufficient to oxidize said hydrocarbon alkylaromatic compound at the benzylic carbon atom.

2. The process of claim 1 wherein the alkylaromatic hydrocarbon is a methyl substituted benzene.

3. The process of claim 1 wherein the Pd(II) salt is present in an amount of from 0.00001% by weight to 3% by weight, based on the weight of alkylaromatic hydrocarbon to be reacted.

4. The process of claim 1 wherein there is added a soluble salt of the formula:

$$MOR'$$

wherein M is an alkali metal or alkaline earth metal, and R' is alkyl, or acyl, in an amount up to its saturation level in the reaction mixture and wherein acyl corresponds to the acyl portion of said carboxylic acid.

5. The process of claim 1 wherein the molar ratio of carboxylic acid to hydrocarbon alkylaromatic compound is at least 1:1.

6. The process of claim 1 wherein there is present a catalyst modifier soluble in the reaction mixture selected from the group consisting of stannous salts, trihydrocarbylphosphines, trihydrocarbylphosphine oxides, trihydrocarbylphosphites, and trihydrocarbylphosphates in which the hydrocarbyl radicals are alkyl or aryl radicals.

7. The process of claim 1 wherein there is present a stannous alkanoate as the catalyst modifier.

8. The process of claim 1 wherein there is additionally present an anti-agglomerant.

9. A liquid phase process which comprises contacting a methyl substituted benzene with oxygen, an alkanoic acid, said alkanoic acid being present in an amount of from 2 to 40 moles per mole of methyl substituted benzene, and an alkali metal salt of an alkanoic acid, in the presence of from 0.00001% by weight to 3% by weight of a catalyst consisting of a palladium(II) salt or a palladium(II) salt plus a catalyst modifier soluble in the carboxylic acid reaction medium selected from the group consisting of: stannous salts, trihydrocarbylphosphines, trihydrocarbylphosphine oxides, trihydrocarbylphosphites and trihydrocarbylphosphates in which the hydrocarbyl groups are alkyl or aryl radicals, based on the weight of methyl substituted benzene to be reacted, as catalyst therefor, at a temperature of from about 50° C. to 150° C. and for a period of time sufficient to oxidize said methyl substituted benzene at a benzylic carbon atom.

10. The process of claim 9 wherein there is present a catalyst modifier soluble in the reaction mixture selected from the group consisting of stannous salts, trihydrocarbylphosphines, trihydrocarbylphosphine oxides, trihydrocarbylphosphites and trihydrocarbylphosphates in which the hydrocarbyl radicals are alkyl or aryl radicals.

11. The process of claim 10 wherein there is also present an anti-agglomerant.

12. The process of claim 11 wherein toluene is the methyl substituted benzene and acetic acid is the alkanoic acid.

13. The process of claim 11 wherein a xylene is the methyl substituted benzene and acetic acid is the alkanoic acid.

References Cited

UNITED STATES PATENTS

| | | | |
|---|---|---|---|
| 3,162,683 | 12/1964 | Jones et al. | 260—524 |
| 3,274,238 | 9/1966 | Kojer et al. | 260—497 |
| 3,275,680 | 9/1966 | Holtzrichter et al. | 260—497 |
| 3,221,045 | 11/1965 | McKeon et al. | 260—497 |

(Other references on following page)

FOREIGN PATENTS

| | | | |
|---|---|---|---|
| 966,809 | 8/1964 | Great Britain | 260—497 |
| 1,423,314 | 11/1965 | France | 260—497 |
| 615,596 | 9/1962 | Belgium | 260—497 |

OTHER REFERENCES

Moiseev et al., Proc. Acad, Sciences, U.S.S.R. (1960), pp. 801–804.

LORRAINE A. WEINBERGER, Primary Examiner

V. GARNER, Assistant Examiner

U.S. Cl. X.R.

260—287, 289, 295, 297, 307, 326.13, 326.18, 410.5, 468, 469, 473, 475, 476, 484, 485, 487, 524, 592, 599, 611